Figure 1:
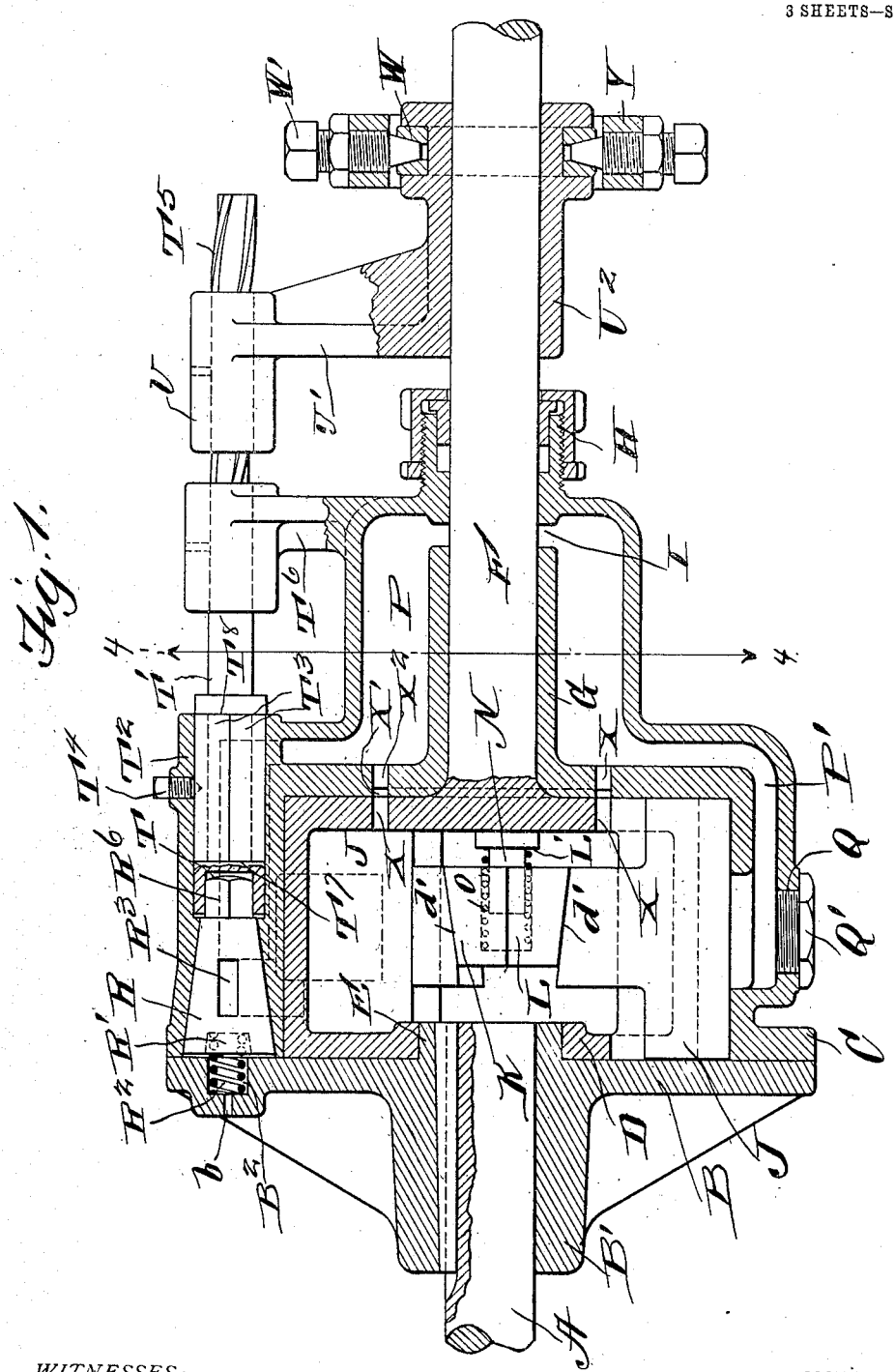

No. 871,243. PATENTED NOV. 19, 1907.
E. G. SHORTT.
FLUID PRESSURE CLUTCH.
APPLICATION FILED AUG. 27, 1906.

3 SHEETS—SHEET 1.

WITNESSES:

INVENTOR.
Edward G. Shortt
BY Franklin N. Hough
ATTORNEY.

No. 871,243. PATENTED NOV. 19, 1907.
E. G. SHORTT.
FLUID PRESSURE CLUTCH.
APPLICATION FILED AUG. 27, 1906.
3 SHEETS—SHEET 2.
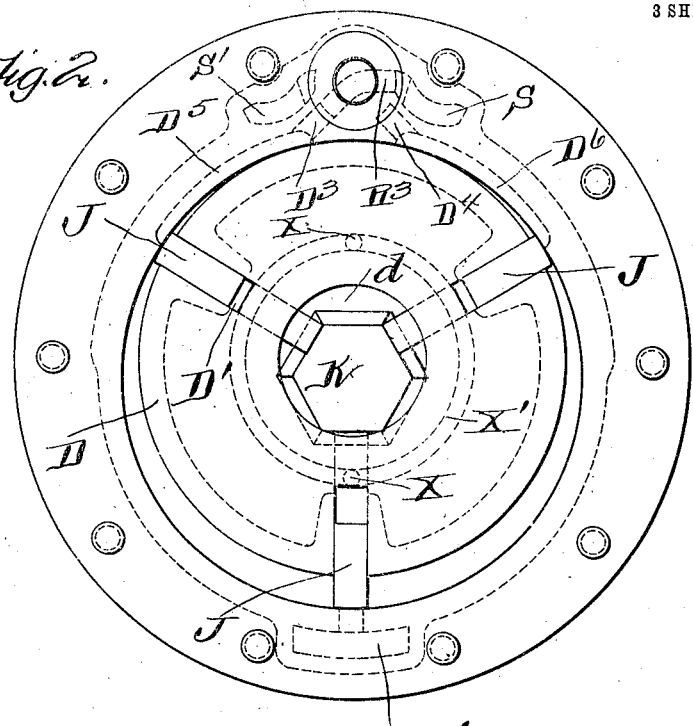
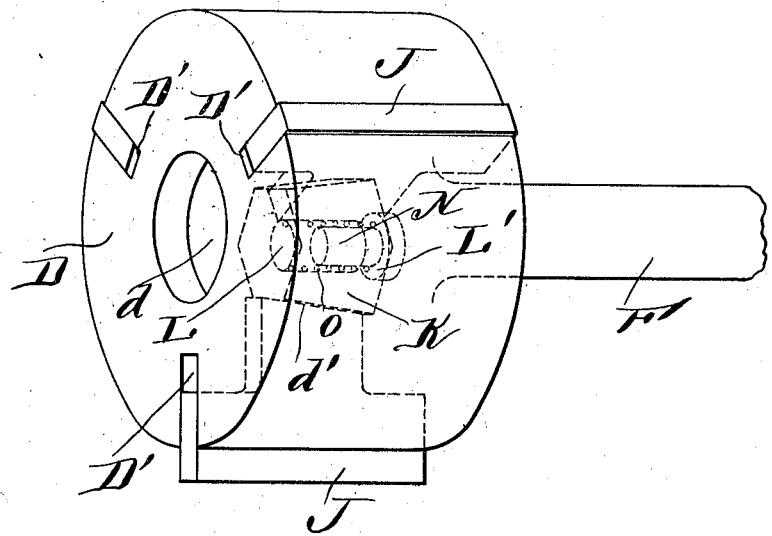
WITNESSES:
N. A. Mayhew.
A. L. Hough
INVENTOR.
Edward G. Shortt,
BY Franklin H. Hough
ATTORNEY.

No. 871,243. PATENTED NOV. 19, 1907.
E. G. SHORTT.
FLUID PRESSURE CLUTCH.
APPLICATION FILED AUG. 27, 1906.
3 SHEETS—SHEET 3.
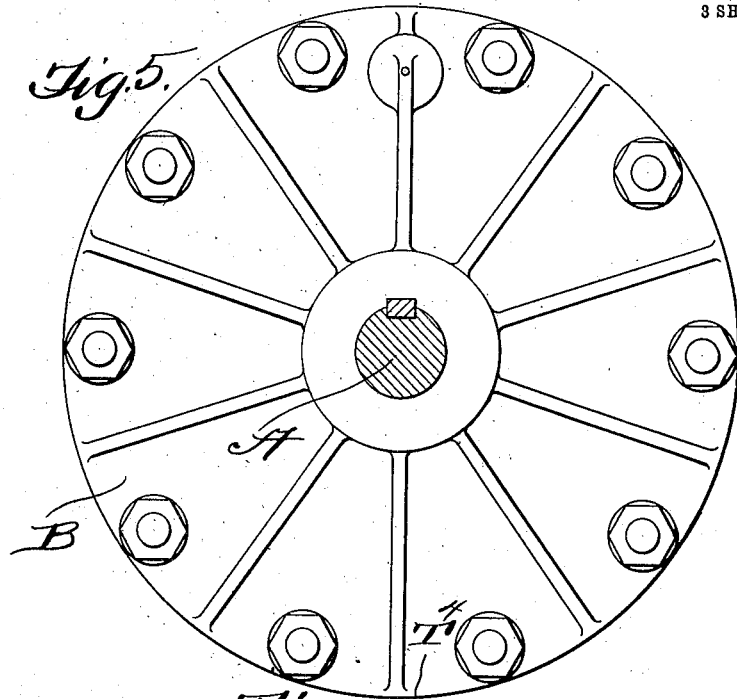
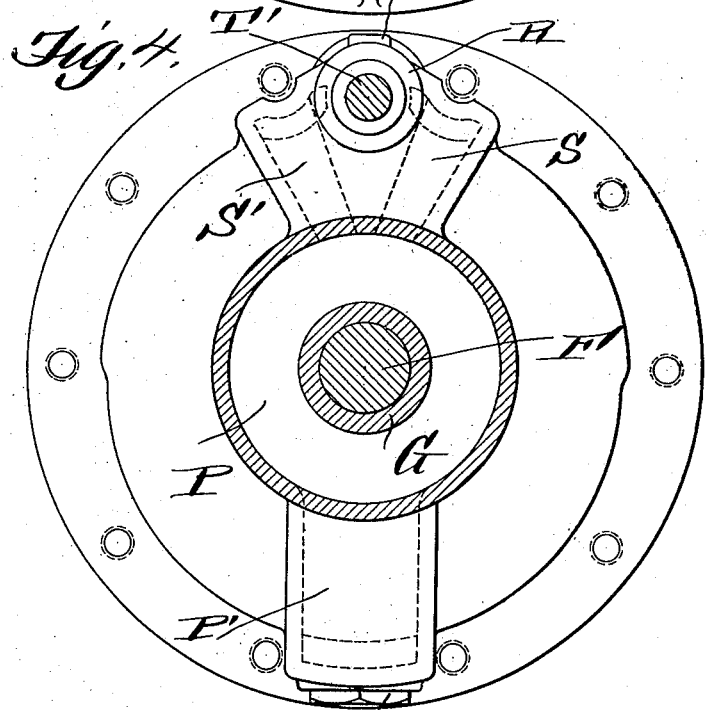
WITNESSES: INVENTOR.
Edward G. Shortt,
BY Franklin N. Hough
ATTORNEY.

UNITED STATES PATENT OFFICE.

EDWARD G. SHORTT, OF CARTHAGE, NEW YORK, ASSIGNOR TO RYAN-HOPKINS MACHINE COMPANY, A CORPORATION OF ILLINOIS.

FLUID-PRESSURE CLUTCH.

No. 871,243.  Specification of Letters Patent.  Patented Nov. 19, 1907.

Application filed August 27, 1906. Serial No. 332,255.

*To all whom it may concern:*

Be it known that I, EDWARD G. SHORTT, a citizen of the United States, residing at Carthage, in the county of Jefferson and State of New York, have invented a certain new and useful Improvement in Fluid-Pressure Clutches; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in fluid pressure clutch mechanism, the object in view being to provide means whereby a differential motion may be imparted to a rotary piston shaft, thereby enabling the latter to start its rotary movement gradually, thus avoiding the usual jarring incident to the throwing of clutch mechanisms commonly in use.

The invention consists essentially in the provision of a rotatable piston eccentrically mounted within a casing, and provided with a series of radially reciprocating blades which are adapted to compress a semi-elastic fluid into a space intermediate the inner surface of the casing and the circumference of the piston, to such an extent that the casing and piston will be caused to gradually rotate together.

The invention comprises various combinations and arrangements of parts as will be hereinafter fully described and then specifically defined in the appended claims.

I illustrate my invention in the accompanying drawings, which, with the letters of reference marked thereon, form a part of this application, and in which:—

Figure 1 is a central longitudinal sectional view through my improved clutch mechanism. Fig. 2 is an end view of the eccentrically mounted piston and parts carried thereby. Fig. 3 is a perspective view of the piston, its reciprocating blades and hexagonal outlined member with inclined faces for actuating the latter, Fig. 4 is a cross sectional view on line 4—4 of Fig. 1, and Fig. 5 is an end view of the casing.

Reference now being had to the details of the drawings by letter, A designates a shaft driven from any source of power, and B is the head of the casing C, to which it is bolted or otherwise securely held. Said head has a central boss B' projecting from the outer face thereof and which is hollow and receives said shaft to which it is keyed. Mounted to rotate within said casing, is a hollow piston D having a central opening d in one end thereof adapted to receive an inwardly projecting annular flange E upon said head B, thus forming a bearing for one end of the piston.

A shaft F, which is integral with said piston, has a bearing in a cylindrical portion G of the casing, and also passes through a suitable stuffing box H, and an annular slot I is formed in said cylindrical portion G, whereby a lubricant, contained within the chambered portion of the casing, may have access to said shaft F. Said piston, a detail view of which is illustrated in Fig. 3, has a series of radial slots D' formed therein, in each of which is mounted a reciprocal blade J, the outer ends of which blades are flush with the ends of the piston, and their inner portions are contracted, and have inclined edges d' which are constantly in contact with the inclined faces of the hexagonal member K, which latter has a recess L formed in one end thereof for the reception of a movable guide block N which has a sliding contact with the inner surface of the end wall of the end of the piston, and also a spiral spring O disposed about said block with one end bearing against the bottom of the recess, and its other end against a shoulder L' of said block. The purpose of said spring is to cause the inclined faces of the member K, to be held in contact with the inclined edges of the blades, and taking up any wear incident to the moving of the parts in contact with one another. As said piston is mounted eccentrically within the casing, and as the outer edges of the blades are held by said hexagonal member in contact with the inner surface of the chambered portion of the casing, it will be noted that as the casing rotates independently of the piston, the blades are successively reciprocated by contact with the inner surface of the casing. As a blade is reciprocated, it bears against one of the inclined faces of said hexagonal member with sufficient force, to cause said member to be given an outward movement, which in turn, will cause the other blades to be moved towards and against the inner surface of the casing. Each blade, therefore, successively, will act upon said member, to cause the other blades to wipe against the inner surface of the casing.

Surrounding the cylindrical portion G of the casing, is an expansion and cooling chamber P, shown clearly in Fig. 1 of the drawings, and a suction port P' leads from said chamber P into the chambered portion of the casing in which said piston is mounted. A filling aperture Q, closed by a threaded plug Q', is provided whereby oil or other fluid may be introduced into the chambers of the casing, and being mixed with air, form a semi-elastic medium which is caused to be compressed by the blades forcing the fluid between the circumference of the piston and the inner surface of the casing, in advance of the blade.

Mounted to have an oscillating movement in a chambered portion of the casing, is a conical shaped valve R, shown clearly in Fig. 1 of the drawings, and one end of said valve is recessed as at R' to receive one end of the spring $R^2$, the other end of which spring bears against the bottom of a recess $B^2$ formed in the inner face of the head of the casing. An oil vent $b$ leads through said head and into the recess $B^2$, whereby a lubricant may be applied to the circumference of said valve. A suitable port $R^3$ is formed in said valve, and is adapted to register with ports $D^3$ or $D^4$ which lead through the wall of the chamber, in which the valve is mounted, accordingly as it may be desired to throw the clutch into or out of gear when the casing is rotating to the right or left. Said port $D^3$ shown in Fig. 2 of the drawings, opens into a recess $D^5$ formed in the inner surface of the casing, the length of which recess is shorter than the length of the blades. Said port $D^4$ communicates with a recess $D^6$, also formed in the inner surface of the casing, the two recesses $D^5$ and $D^6$ being of similar size, and positioned as shown by dotted lines in Fig. 2, affording escape passageways for the fluid compressed by one or another of the blades, accordingly as the clutch mechanism is being rotated in one direction or the other. When the valve is in the position illustrated in Fig. 2, in which position, the ports $R^3$ and $D^3$ are in registration, the port $R^3$ will also be in registration with a port S, which leads through the wall of the casing, and communicates with the expansion chamber, whereby the fluid being forced by a blade, through the recess $D^5$, and the ports $D^3$ and $R^3$, may escape to the interior of the cooling or expansion chamber P. A port S' is formed through the wall of the chamber in which said valve is mounted, and also leads into the cooling or expansion chamber to allow the fluid to escape back into said chamber, when the mechanism is rotated in a reverse direction, the course which the fluid would take in the latter instance, being from the recess $D^6$, through the ports $D^4$, $R^3$ and S', into the chamber P. One end of said valve is reduced and squared as at $R^6$, and is adapted to be seated in a socket T, formed in one end of the rock shaft T', one end of which is mounted within a chamber $T^2$ of the casing, continuous with the valve chamber. Positioned within the chamber $T^2$, is a boxing, made up of two semi-cylindrical sections $T^3$, and between which one end of the rock shaft has a bearing. The ends of said box sections are prevented from longitudinal movements by the shoulders $T^7$ and $T^8$ formed upon the shaft, and between which the bearing box sections are mounted. A set-screw $T^4$ is fitted in a threaded aperture in the casing, and is adapted to engage one of the box sections, thereby preventing the latter from rotating with the rock shaft.

Projecting from the casing is a bracket arm $T^6$, having a head which is chambered and rabbeted to form a bearing for the shaft T'. A portion of the length of the shaft T' has spiral threads $T^5$ formed thereon, which are adapted to engage correspondingly formed grooves in the inner surface of the shell U, which is integral with the bracket arm U', which in turn is integral with the clutch shell $U^2$ loosely journaled upon the shaft F. Said shell $U^2$ has formed in the circumference thereof, an annular groove in which are swiveled two ring sections W, which have each a recess formed therein to receive the end of a screw W', there being two of the latter carried by the clutch operating lever Y, shown in section in Fig. 1 of the drawings.

An annular groove X' is formed in one face of the partition M of the casing, and perforations X extend through one end of the blade carrying piston, whereby any of the fluid, which, by excessive pressure may have leaked by the blades, may pass into said groove, and from the latter pass through the apertures $X^2$ in said partition, back into the cooling or expansion chamber of the casing.

The operation of my invention is as follows. Oil or other suitable liquid, is poured into the chambered portions of the casing, nearly filling the same, a sufficient quantity of air being within the chambers to allow for an efficient elasticity to the fluid. As the casing rotates continuously in one direction or the other, and should it be desired to throw the clutch mechanism so that the blade carrying piston will rotate therewith, and also the shaft integral with said piston, the clutch lever is operated in one direction or the other, thereby causing the shaft T' to rock, which in turn will cause the valve to oscillate, to open or close one of the ports $D^3$ or $D^4$. For instance, if the casing were rotating to the right, and it is desired to cause the blade carrying piston to rotate therewith, the valve R is thrown so that the ports D³ and R³ will be out of registration, and the semi-elastic fluid which is compressed by one of the blades forcing the fluid between the outer surface of the piston D and the inner surface of the casing, not being able to escape through the recess D⁵ and port D³, will bear with sufficient pressure against the piston and casing, to cause the piston to rotate with the casing. In the event of any seepage of the fluid, about the blades or edge of the shell, it will return to the cooling chamber of the casing, through the perforations $x$, and the annular groove X', and apertures X². When it is desired to release the clutch, the clutch lever is operated to oscillate the valve, to bring the port R³ into registration with the port D³, which will allow the compressed fluid to escape through the port of the valve, and back to the cooling chamber through the port S. To reverse the movement of the clutch, the valve is rotated in the opposite direction, and the port D⁴ is closed and the same effect is produced.

What I claim is:—

1. A fluid pressure clutch mechanism comprising a rotatable fluid containing casing having two compartments with a valve-regulated passageway communicating between the same, a hollow rotatable piston mounted eccentrically within one of said compartments and having relief port communication with the other compartment, and a series of movable compression blades carried by said piston, as set forth.

2. A fluid pressure clutch mechanism comprising a rotatable fluid containing casing having two compartments with a valve-regulated passageway communicating between the same, a hollow rotatable piston mounted eccentrically within one of said compartments and having relief port communication with the other compartment, said piston having radial slots, a series of reciprocating compression blades mounted in said slots, and means for moving the blades, as set forth.

3. A fluid pressure clutch mechanism comprising a rotatable fluid containing casing having two compartments with a valve-regulated passageway communicating between the same, a hollow rotatable piston mounted eccentrically within one of said compartments and having continuous relief port communication with the other compartment, a series of movable compression blades carried by said piston, and a single movable member within said piston, and continuously in contact with each of the blades, as set forth.

4. A fluid pressure clutch mechanism comprising a rotatable fluid containing casing having two compartments with a valve-regulated passageway communicating between the same, a hollow rotatable piston mounted eccentrically within one of said compartments and having continuous relief port communication with the other compartment, a series of movable compression blades carried by said piston, and a single movable member within said piston and co-operating with the surrounding wall of the compartment, in which the piston is located, and said blades, to cause the latter to be reciprocated, as set forth.

5. A fluid pressure clutch mechanism comprising a rotatable fluid containing casing having two compartments with a valve-regulated passageway communicating between the same, a hollow rotatable piston mounted eccentrically within one of said compartments and having continuous relief port communication with the other compartment, a series of movable compression blades carried by said piston, and a single spring-pressed member bearing against the inner end of said blades, as set forth.

6. A fluid pressure clutch mechanism comprising a rotatable chambered casing adapted to contain a fluid, a piston mounted eccentrically within said casing, a series of reciprocating blades carried by the piston, a spring-pressed member having an angled and inclined surface bearing against the inner ends of said blades, the outer ends of the latter being adapted to wipe against the inner surface of the chambered casing and designed to compress the fluid intermediate the piston and casing, and valve-regulated mechanism for relieving the pressure upon the fluid, as set forth.

7. A fluid pressure clutch mechanism comprising a rotatable chambered casing adapted to contain a fluid, a piston mounted eccentrically within said casing, a series of reciprocating blades mounted in radial slots in said piston and adapted to wipe against the inner surface of the casing, a laterally movable member within the piston and having an angled tapering surface, and against which the inner edges of said blades are adapted to contact, and valve-regulated ports for relieving the pressure upon the liquid, as set forth.

8. A fluid pressure clutch mechanism comprising a rotatable chambered casing adapted to contain a fluid, a piston mounted eccentrically within said casing, a series of reciprocating blades mounted in radial slots in said piston and adapted to wipe against the inner surface of the casing, a laterally movable member within the piston and having an angled tapering surface adapted to support and hold the outer ends of the blades so that they will contact with the inner surface of the chambered casing, and valve-regulated ports for relieving the pressure upon the fluid, as set forth.

9. A fluid pressure clutch mechanism comprising a rotatable chambered casing adapted to contain a fluid, a piston mounted eccentrically within the casing, reciprocating blades working in radial slots in said piston and adapted to wipe against the inner surface of said casing, a laterally movable member within said piston and having a tapering circumference made up of a series of flat faces, the inner edge of each of said blades being inclined and in contact each with an inclined face of said member, a spring bearing against said member, and valve-regulated ports for relieving the pressure upon said fluid, as set forth.

10. A fluid pressure clutch mechanism comprising a rotatable chambered casing adapted to contain a fluid, a piston mounted eccentrically within the casing, reciprocating blades working in radial slots in said piston and adapted to wipe against the inner surface of said casing, a laterally movable member within said piston and having a tapering circumference made up of a series of flat faces, the inner edge of each of said blades being inclined and in contact each with an inclined face of said member, a spring bearing against said member, a movable guide block bearing against the inner surface of one end of the piston and extending into a recess in said member, and valve-regulated ports for relieving the pressure upon said fluid, as set forth.

11. A fluid pressure clutch mechanism comprising a rotatable chambered casing, a piston mounted eccentrically within the latter, reciprocating blades carried by said piston and designed to compress a fluid intermediate the piston and wall of the casing, whereby the piston and casing may be caused to rotate together, a shaft fixed to said piston, an expansion chamber, a rotatable valve with a port therein adapted to register with passageways leading from said casing to the expansion chamber, a spiral geared shaft fixed to said valve, as set forth.

12. A fluid pressure clutch mechanism comprising a rotatable chambered casing, a piston mounted eccentrically within the latter, reciprocating blades working in slots in said piston and designed to compress a fluid intermediate the piston and the wall of the casing, whereby the piston and casing may be caused to rotate together, a rotatable valve, a rock shaft having spiral threads upon its circumference, a movable shell having a chambered portion with spiral grooves adapted to engage said threads, and means for moving said shell, whereby the spiral shaft may be rotated, as set forth.

13. A fluid pressure clutch mechanism comprising a rotatable chambered casing, a piston mounted eccentrically within the latter, reciprocating blades working in slots in said piston and designed to compress a fluid intermediate the piston and the wall of the casing, whereby the piston and casing may be caused to rotate together, a rotatable valve, a rock shaft having spiral threads upon its circumference, a movable shell having a chambered portion with spiral grooves adapted to engage said threads, a shaft fixed to said piston, a shell movably mounted thereon, and lever mechanism for moving said shell upon the piston shaft, as set forth.

14. A fluid pressure clutch mechanism comprising a rotatable chambered casing, a piston mounted eccentrically within the latter, reciprocating blades working in slots in said piston and designed to compress a fluid intermediate the piston and the wall of the casing, whereby the piston and casing may be caused to rotate together, a rotatable valve adapted to regulate ports in the casing and rock shaft, a socket in the end of said rock shaft adapted to receive the squared end of said valve, and means for rocking the shaft, as set forth.

15. A fluid pressure clutch mechanism comprising a rotatable chambered casing, a piston mounted eccentrically within the latter, reciprocating blades working in slots in said piston and designed to compress a fluid intermediate the piston and the wall of the casing, whereby the piston and casing may be caused to rotate together, a rotatable valve adapted to regulate ports in the casing and rock shaft, a socket in the end of said rock shaft adapted to receive the squared end of said valve, a shaft fixed to the piston, a movable shell upon said piston shaft, and lever mechanism for moving said shell upon the shaft, and an integral arm upon said shell provided with a head which is chambered, the walls of said chamber being provided with spiral grooves adapted to receive spiral threads upon the rock shaft, as set forth.

16. A fluid pressure clutch mechanism comprising a rotatable chambered casing, a piston mounted eccentrically within the latter, reciprocating blades working in slots in said piston and designed to compress a fluid intermediate the piston and the wall of the casing, whereby the piston and casing may be caused to rotate together, a rotatable valve adapted to regulate ports leading through the casing, a rock shaft, a sectional bearing box mounted in the chambered portion of the casing and in which said rock shaft has a bearing, shoulders adapted to limit the longitudinal movement of the rock shaft, means for preventing the boxes from turning within the casing, and mechanism for rocking said shaft, as set forth.

17. A fluid pressure clutch mechanism comprising a rotatable chambered casing, a piston mounted eccentrically within the latter, reciprocating blades working in slots in said piston and designed to compress a fluid intermediate the piston and the wall of the casing, whereby the piston and casing may be caused to rotate together, a rotatable valve adapted to regulate ports leading through the casing, a rock shaft, a sectional bearing box mounted in the chambered portion of the casing and in which said rock shaft has a bearing, shoulders adapted to limit the longitudinal movement of the rock shaft, means for preventing the boxes from turning within the casing, mechanism for rocking said shaft, a shaft fixed to said piston, a shell movably mounted upon the piston shaft provided with an integral arm which has a chambered head, the walls of which are provided with spiral grooves adapted to receive spiral threads upon the rock shaft, a bearing for the rock shaft, and lever mechanism for actuating said shell, as set forth.

18. A fluid pressure clutch mechanism comprising a rotatable chambered casing, a piston mounted eccentrically within the latter, reciprocating blades carried by the piston, valve mechanism for regulating the ports leading through the casing, said casing having a partition with an annular groove therein with apertures leading through said partition and adapted to register with apertures formed in said piston, whereby any seepage of fluid about the piston or blades may make exit to the interior of the casing, as set forth.

19. A fluid pressure clutch mechanism comprising a rotatable chambered casing, a hollow piston mounted therein, an expansion and cooling chamber with a continuously communicating passageway between the latter and the interior of said piston to prevent pressure forming in the interior of the piston, as set forth.

In testimony whereof I hereunto affix my signature in the presence of two witnesses.

EDWARD G. SHORTT.

Witnesses:
HADLEY SMITH,
ETHEL C. SWEET